United States Patent
Onizuka

(10) Patent No.: US 11,922,243 B2
(45) Date of Patent: Mar. 5, 2024

(54) ELECTRONIC APPARATUS, SYSTEM, METHOD, AND COMPUTER PROGRAM

(71) Applicant: KABUSHIKI KAISHA TOSHIBA, Tokyo (JP)

(72) Inventor: Kohei Onizuka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 281 days.

(21) Appl. No.: 17/470,222

(22) Filed: Sep. 9, 2021

(65) Prior Publication Data

US 2022/0147784 A1 May 12, 2022

(30) Foreign Application Priority Data

Nov. 6, 2020 (JP) .................. 2020-185841

(51) Int. Cl.
*G06K 19/07* (2006.01)
*H02J 50/80* (2016.01)

(52) U.S. Cl.
CPC .......... *G06K 19/0709* (2013.01); *H02J 50/80* (2016.02)

(58) Field of Classification Search
CPC ...... G06K 19/0709; H02J 50/80; H02J 50/20; H02J 50/90; H02J 2310/50
See application file for complete search history.

(56) References Cited

U.S. PATENT DOCUMENTS

| | | | | |
|---|---|---|---|---|
| 9,846,856 B2* | 12/2017 | Rinzler | ................. | H02J 7/0013 |
| 2011/0127952 A1* | 6/2011 | Walley | .................... | H02J 50/10 |
| | | | | 320/108 |
| 2016/0323825 A1* | 11/2016 | Yamaji | ................. | H04B 5/0037 |
| 2018/0109131 A1* | 4/2018 | Nemoto | ............. | H02J 7/00712 |
| 2018/0351412 A1* | 12/2018 | Gabriel | ............... | H04B 5/0031 |

FOREIGN PATENT DOCUMENTS

| | | |
|---|---|---|
| JP | 2017-28770 A | 2/2017 |
| JP | 2018-182656 A | 11/2018 |
| JP | 2020-162235 A | 10/2020 |

* cited by examiner

*Primary Examiner* — Yong Hang Jiang
(74) *Attorney, Agent, or Firm* — Finnegan, Henderson, Farabow, Garrett & Dunner, LLP

(57) ABSTRACT

According to one embodiment, an electronic apparatus includes a processor configured to: acquire communication data from at least one communication apparatus that perform wireless communication with a plurality of the communication devices; acquire information related to a wireless power supply performed by a wireless power supply apparatus to the at least one communication apparatus; and generate a control signal indicating an instruction of at least one of the wireless power supply or the wireless communication based on the communication data and the information related to the wireless power supply.

15 Claims, 12 Drawing Sheets

ELECTRONIC APPARATUS, SYSTEM, METHOD, AND COMPUTER PROGRAM

CROSS-REFERENCE TO RELATED APPLICATIONS

This application is based upon and claims the benefit of priority from Japanese Patent Application No. 2020-185841, filed on Nov. 6, 2020; the entire contents of which are incorporated herein by reference.

FIELD

Embodiments described herein relate generally to an electronic apparatus, a system, a method, and a computer program.

BACKGROUND

Depending on a situation, it is difficult to perform power supply or communication from a wireless power supply apparatus to a communication device. When power supply or communication is performed via a communication apparatus that performs wireless communication with a communication device, it is necessary to control power supply to the communication apparatus by a wireless power supply apparatus or communication by the communication apparatus.

DETAILED DESCRIPTION

Figure 1:
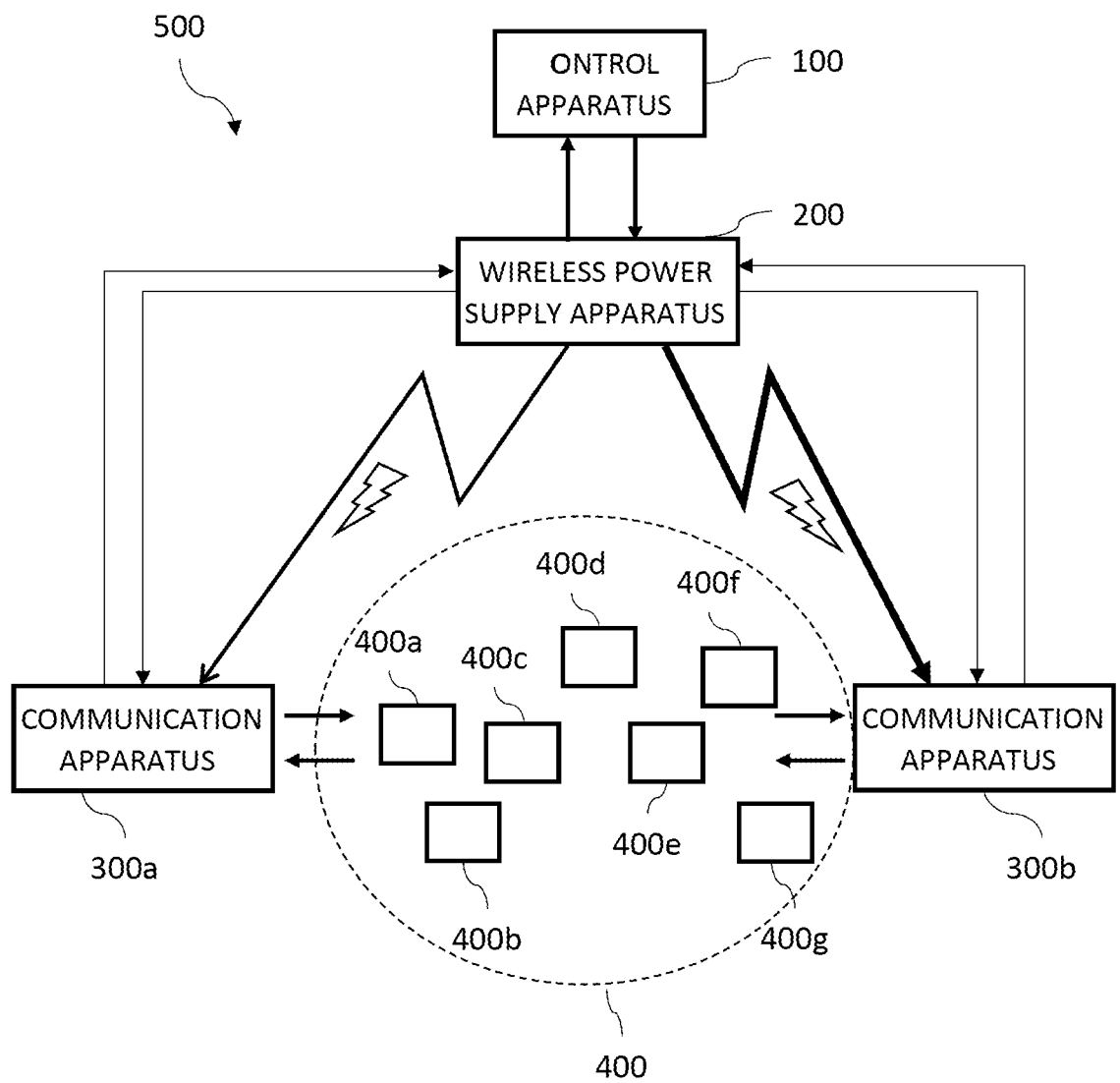
FIG. 1 is a conceptual diagram of a control system 500 according to a first embodiment.

According to one embodiment, an electronic apparatus includes a processor configured to: acquire communication data from at least one communication apparatus that perform wireless communication with a plurality of the communication devices; acquire information related to a wireless power supply performed by a wireless power supply apparatus to the at least one communication apparatus; and generate a control signal indicating an instruction of at least one of the wireless power supply or the wireless communication based on the communication data and the information related to the wireless power supply.

Hereinafter, embodiments of the present invention will be described in reference to the drawings. Disclosure is only an example, invention is not limited by the contents described in the following embodiments. In the drawings, the size, shape, and the like may be schematically represented to make the description more clear. In the multiple drawings, corresponding elements are denoted by the same reference numerals, and detailed description may be omitted.

(First Embodiment)

FIG. 1 illustrates a control system 500 in this embodiment. The control system 500 includes a control apparatus 100, a wireless power supply apparatus 200, at least one communication apparatus 300 (in this embodiment, 300a, 300b), and a plurality of communication devices 400 (in this embodiment, 400a to 400g). The control system 500 may be also a system, the control apparatus 100 may be also an electronic apparatus. The control apparatus 100 generates and transmits at least one control signal including instructions for wireless power supply performed by the wireless power supply apparatus 200 to the at least one communication apparatus 300 (300a, 300b) and communication performed by the at least one communication apparatus 300 (300a, 300b) with the plurality of communication devices 400. Each of the communication apparatuses 300a, 300b may communicate with at least one of the communication devices 400, respectively. The wireless power supply apparatus 200 wirelessly supplies power to the at least one communication apparatus 300 (300a, 300b), and transmits an instruction of wireless communication between the at least one communication apparatus 300 (300a, 300b), and the plurality of communication devices 400, respectively. The at least one communication apparatus 300 (300a, 300b) perform wireless communication with the communication devices 400 and transmit acquired communication data to the wireless power supply apparatus 200. The communication data is transmitted to the control apparatus 100. The control apparatus 100 controls at least one of wireless power supply and wireless communication between the at least one communication apparatus 300 (300a, 300b) and the communication devices 400. In this way, the control apparatus 100 can make at least one of the wireless power supply and the wireless communication between the at least one communication apparatus 300 (300a, 300b) and the communication devices 400 more efficient and streamlining.

Any standard can be applied to communication between the control apparatus 100 and the wireless power supply apparatus 200, wireless power supply and communication between the wireless power supply apparatus 200 and the communication apparatuses 300a, 300b, and wireless communication between the communication apparatuses 300a, 300b and the communication devices 400. The communication may be wired communication or wireless communication.

Figure 2:
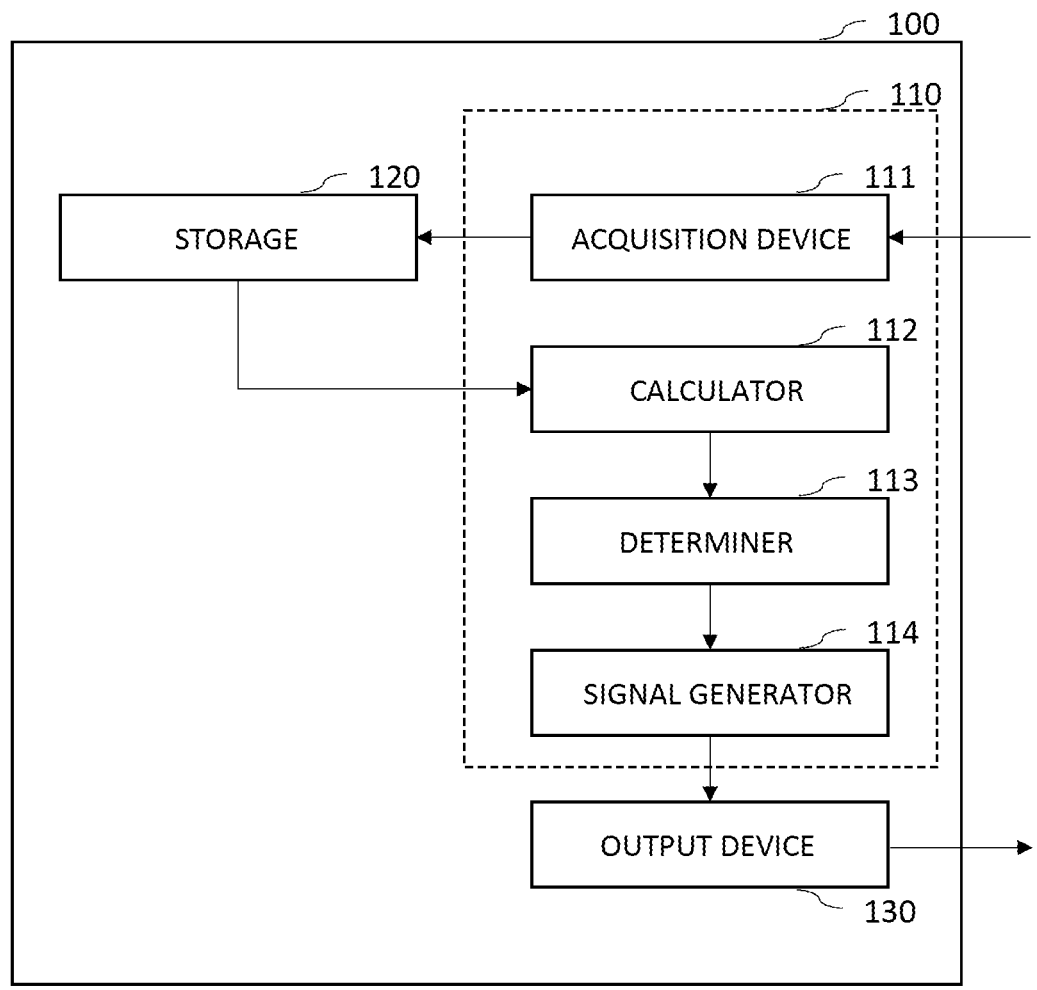
FIG. 2 is a configuration diagram of a control apparatus 100 according to the first embodiment.

FIG. 2 illustrates a configuration example of the control apparatus 100. The control apparatus 100 includes a processor 110, a storage 120, and an output device 130. The processor 110 includes an acquisition device 111, a calculator 112, a determiner 113, and a signal generator 114.

The acquisition device 111 acquires information related to wireless power supply of at least one of the wireless power supply apparatus 200 or the communication apparatuses 300a, 300b, and communication data acquired through wireless communication between the communication apparatuses 300a or 300b, and the communication devices 400. The information related to wireless power supply includes at least one of: propagation path information between the wireless power supply apparatus 200 and the communication apparatuses 300a or 300b; propagation conditions of wireless power supply; suppliable power to the communication apparatuses 300a, 300b; information indicating positions of the wireless power supply apparatus 200 and the communication apparatuses 300a, 300b (including estimated information); or required power amounts of the communication apparatuses 300a, 300b in communication data acquisition. The communication data is, for example, identification information of the communication devices 400 or various types of data acquired by the communication devices 400 through measurement or imaging. The identification information of the communication apparatuses 300a, 300b is associated with the communication data acquired by the communication apparatuses 300a, 300b. The information related to the wireless power supply and the communication data are used to determine instructions for wireless power supply from the wireless power supply apparatus 200 to the communication apparatuses 300a, 300b, and wireless communication between the communication apparatuses 300a or 300b, and the communication devices 400. The acquisition device 111 causes the storage 120 to hold the acquired information related to the wireless power supply and communication data.

The storage 120 holds information related to the wireless power supply and communication data sent from The acquisition device 111. The storage 120 is a memory or the like, and is, for example, a random access memory (RAM), a programmable ROM (PROM), an erasable PROM (EPROM), an electrically EPROM (EEPROM), a flash memory, a register, or the like. The storage 120 may be provided outside the control apparatus 100 as well as inside the control apparatus 100. When provided externally, the storage 120 may be a cloud that holds information via the Internet.

The calculator 112 calculates an evaluation value of information related to wireless power supply and communication data held in the storage 120. For example, the calculator 112 calculates evaluation values such as streamlining of the wireless power supply to the communication apparatuses 300a, 300b and suppliable power to the communication apparatuses 300a, 300b based on the information related to the wireless power supply. When the identification information of the communication devices 400 is included in the communication data, the calculator 112 calculates an evaluation value related to acquisition of the identification information. This evaluation value is, for example, calculated for each of the communication apparatuses 300a, 300b based on at least one of the acquisition rate (acquisition success rate), packet error rate, acquisition time of the identification information, a number of the identification information, fluctuation amount of acquisition speed of the identification information in the communication devices 400, or information (list) indicating the identification information acquired by the communication apparatuses 300a, 300b respectively. The fluctuation amount indicates of fluctuation amount of acquisition speed of the identification information with respect to time. The higher the acquisition rate of the identification information of the communication devices 400 is, the lower the packet error rate is, the shorter the acquisition time of the identification information of the communication devices 400 is, the smaller the fluctuation amount is, or the less overlap between the information (list) indicating the identification information acquired by the communication apparatuses 300a and 300b, the more efficiently communication between the communication apparatuses 300a or 300b, and the communication devices 400.

Alternatively, the calculator 112 may calculate, as the evaluation value, the amount of communication data acquired by each of the communication apparatuses 300a, 300b. In a case where amount of data is included in the communication data, the calculator 112 may acquire the amount of data as the evaluation value. The larger the amount of communication data, the larger the amount of communication data acquired (to be acquired) by the communication apparatuses 300a, 300b.

The determiner 113 determines an instruction for at least one of wireless power supply from the wireless power supply apparatus 200 to the communication apparatuses 300a, 300b or wireless communication between the communication apparatuses 300a, 300b and the communication devices 400. More specifically, the determiner 113 determines an instruction for at least one of the wireless power supply and the wireless communication based on the information related to wireless power supply and the evaluation value of the communication data sent from the calculator 112. For example, the determiner 113 determines at least one of a power supply time, a power supply intensity, a power supply frequency, or a power supply amount is determined for each of the communication apparatuses 300a, 300b. Examples of the instruction to each of the communication apparatuses 300a, 300b for wireless communication include at least one of a direction, a range, a frequency, power, frequency, or transmission timing of a signal used for wireless communication with the communication devices 400. The determiner 113 sends the determined instruction to the signal generator 114.

The signal generator 114 generates a control signal including the instruction of at least one of the wireless power supply and the wireless communication sent from the determiner 113. The signal generator 114 may divide the control signal into a power supply control signal including the instruction of wireless power supply and a communication control signal including the wireless communication instruction. The signal generator 114 transmits the generated control signal to the output device 130.

The output device 130 outputs the control signal sent from the signal generator 114 to the wireless power supply apparatus 200. Hereinafter, "output" may be also expressed "transmit". The output device 130 may output the control signal to the communication apparatuses 300a, 300b, may output the power supply control signal to the wireless power supply apparatus 200, and may output the communication control signal to the communication apparatuses 300a, 300b. These outputs (transmissions) may be performed by wireless or wired communication.

The configuration of the control apparatus 100 has been described above. At least some of the components of the control apparatus 100 may be implemented by an integrated circuit such as an integrated circuit (IC) or a large scale integration (LSI). In FIG. 2, The acquisition device 111, the calculator 112, the determiner 113, and the signal generator 114 are included in the processor 110. The processor 110 is one or more electronic circuits including a control device and an arithmetic device. The electronic circuit is realized by an analog or digital circuit or the like. For example, a general purpose processor, a central processor (CPU), a microprocessor, a digital signal processor (DSP), an ASIC, an FPGA, and combinations thereof are applicable. Although The acquisition device 111 is included in the processor 110 in FIG. 2, a hardware configuration not included in the processor 110 may be employed. In addition, the output device 130 is not included in the processor 110, but may be included in the processor 110.

Figure 3:
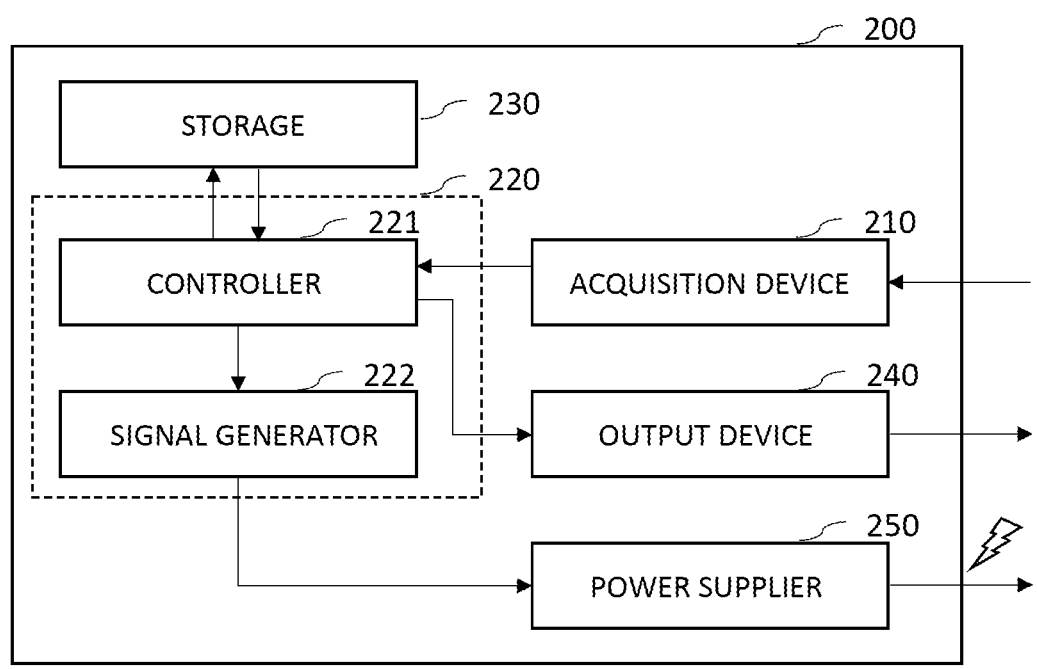
FIG. 3 is a configuration diagram of a wireless power supply apparatus 200 according to the first embodiment.

The wireless power supply apparatus 200 receives a control signal (power supply control signal) from the control apparatus 100 and performs at least one of wireless power supply and transmission of a control signal including the instruction of wireless communication to each of the communication apparatuses 300a, 300b. The wireless power supply apparatus 200 acquires communication data transmitted from the communication apparatuses 300a, 300b and transmits the communication data to the control apparatus 100. FIG. 3 illustrates a configuration example of the wireless power supply apparatus 200. The wireless power supply apparatus 200 includes an acquisition device 210, a processor 220, a storage 230, an output device 240, and a power supplier 250. The processor 220 includes a controller 221 and a signal generator 222.

The acquisition device 210 acquires a control signal (power supply control signal) sent from the control apparatus 100 and communication data acquired by the communication apparatuses 300a, 300b through wireless communication with the communication devices 400. When the communication with the control apparatus 100, the communication apparatuses 300a, or 300b is wireless communication, the acquisition device 210 may include one or more antennas and acquire the control signal and the communication signal via the antennas. The control signal and the communication data are sent to the controller 221.

The controller 221 instructs the signal generator 222 to generate a signal for wireless power supply (hereinafter also referred to as a power supply signal) based on the instruction of wireless power supply included in the control signal sent from the acquisition device 210. The controller 221 causes the storage 230 to hold the communication data sent from the acquisition device 210. The controller 221 extracts the communication data held in the storage 230 and sends the communication data to the output device 240 corresponding to an instruction from the control apparatus 100, predetermined time, predetermined time interval, or the like. The controller 221 sends a control signal (communication control signal) including an instruction of wireless communication sent from the acquisition device 210 to the output device 240.

The storage 230 holds the communication data sent from the acquisition device 210. For the storage 230, the device and method described for the storage 120 can be applied.

The output device 240 outputs the control signal (communication control signal) sent from the controller 221 to the communication apparatuses 300a, 300b. Hereinafter, "output" may be also expressed "transmit". The output device 240 outputs the communication data sent from the controller 221 to the control apparatus 100. When the communication with the control apparatus 100, the communication apparatuses 300a, or 300b is wireless communication, the output device 240 may include one or more antennas and output the control signal (communication control signal) and the communication data via the antennas.

The signal generator 222 generates a power supply signal based on the instruction sent from the controller 221, and sends the power supply signal to the power supplier 250. The power supplier 250 includes one or more antennas, transmits a power supply signal to the communication apparatuses 300a, 300b via the antennas, and performs wireless power supply. In FIG. 3, a lightning mark is added to indicate that power is supplied.

The configuration of the wireless power supply apparatus 200 has been described above. At least some of the components of the wireless power supply apparatus 200 may be implemented by an integrated circuit such as an IC or an LSI. In FIG. 3, the controller 221 and the signal generator 222 are included in the processor 220. The electronic circuit described for the processor 110 can be applied to the processor 220. Although the acquisition device 210 and the output device 240 are not included in the processor 220 in FIG. 3, for example, acquisition of a control signal and transmission of communication data to the control apparatus 100 may be included in the processor 220. In some cases, the acquisition device 210, the output device 240, and the power supplier 250 include antennas. These antennas may be independent or may be shared by at least some of the components.

Figure 4:
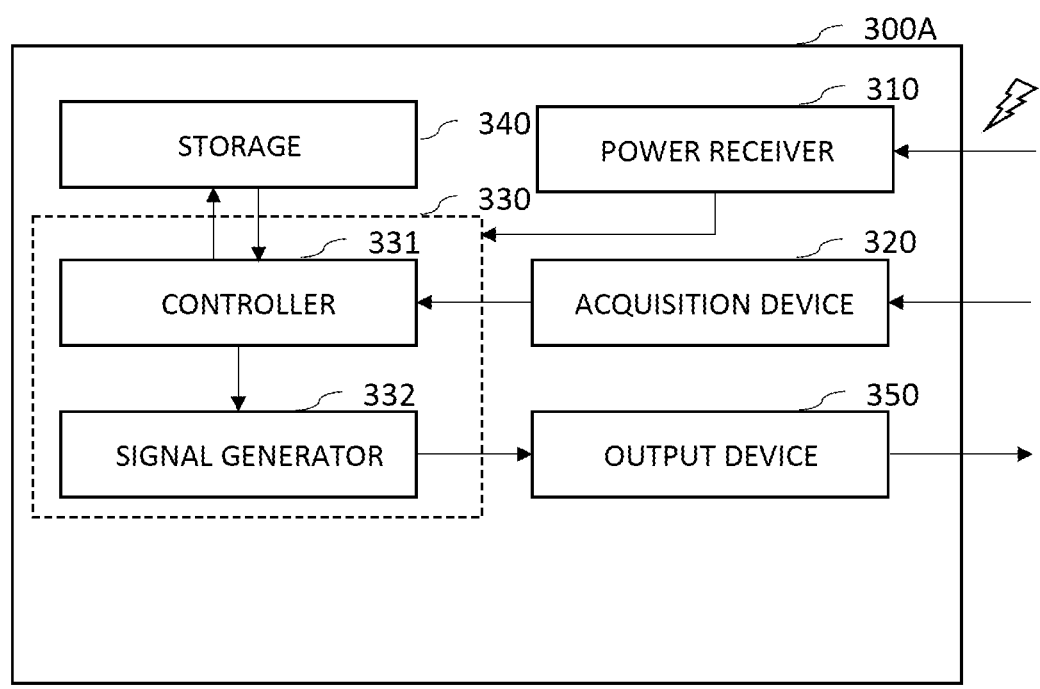
FIG. 4 is a configuration diagram of a communication apparatus 300a according to the first embodiment.

The communication apparatuses 300a, 300b are driven by receiving wireless power supply from the wireless power supply apparatus 200, communicate with the communication devices 400, and acquire the communication data. The communication between communication apparatuses 300a, 300b and the communication devices 400 is controlled by the control signal including the wireless communication instruction transmitted from the control apparatus 100 or the wireless power supply apparatus 200. The communication apparatuses 300a, 300b transmit the acquired communication data to the wireless power supply apparatus 200. FIG. 4 illustrates a configuration example of the communication apparatus 300a. The communication apparatus 300a includes a power receiver 310, an acquisition device 320, a processor 330, a storage 340, and an output device 350. The processor 330 includes a controller 331 and a signal generator 332. Since the configuration example of the communication apparatus 300b is the same as that of the communication apparatus 300a, the description thereof will be omitted.

The power receiver 310 includes one or more antennas and receives the power supply signal transmitted from the wireless power supply apparatus 200. The received power is supplied to the acquisition device 320 and the output device 350 in addition to the processor 330. The power receiver 310 may include a power storage device, and received power may be stored in the power storage device, and power necessary for driving may be supplied from the power storage device to the processor 330, the obtaining portion 320, and the output portion 350. In FIG. 4, a lightning mark is added to indicate that power is supplied.

The acquisition device 320 acquires a control signal (communication control signal) transmitted from the wireless power supply apparatus 200 and communication data by wireless communication with the communication devices 400. The acquisition device 320 includes one or more antennas and acquires communication data via the antennas. When the communication with the wireless power supply apparatus 200 is wireless communication, the control signal may be acquired via the antenna. The control signal and the communication data are sent to the controller 331. The acquisition device 320 may acquire the control signal (communication control signal) from the control apparatus 100.

The controller 331 instructs the signal generator 332 to generate a signal for wireless communication (hereinafter also referred to as a communication signal) based on the instruction of wireless communication included in the control signal sent from the acquisition device 320. The communication signal is, for example, a signal for transmitting communication data to the received communication devices 400. The controller 331 associates identification information of own communication apparatus 300a with the communication data sent from the acquisition device 320 and causes the storage to hold the communication data. The controller 331 extracts the communication data held in the storage 340 and sends to the signal generator 332 corresponding to the instruction from the control apparatus 100 or the wireless power supply apparatus 200, predetermined time, predetermined time interval, or the like.

The storage 340 holds the communication data sent from the acquisition device 320. For the storage 340, the device and method described for the storage 120 can be applied.

The signal generator 332 generates a communication signal based on an instruction sent from the controller 331, and sends the communication signal to the output device 350. In addition, the signal generator 332 sends the communication data sent from the controller 331 to the output device 350. The output device 350 includes one or more antennas, and outputs the communication signal sent from the signal generator 332 to the communication devices 400 via the antennas. Hereinafter, "output" may be also expressed "transmit". Note that the direction, range, frequency, and power of the communication signal are determined by the controller 331 based on the instruction of wireless communication. The output device 350 outputs the communication data sent from the signal generator 332 to the wireless power supply apparatus 200. When the communication with the wireless power supply apparatus 200 is wireless communication, the output device 350 may output communication data via the antenna.

The configuration of the communication apparatus 300a has been described above. At least some of the components of the communication apparatus 300a may be implemented by integrated circuits such as ICs and LSIs. In FIG. 4, the controller 331 and the signal generator 332 are included in the processor 330. The electronic circuit described for the processor 110 can be applied to the processor 330. In case of the power receiver 310, the acquisition device 320, and the output device 350 includes an antenna. These antennas may be independent from each other or may be shared by at least some components.

Figure 5:
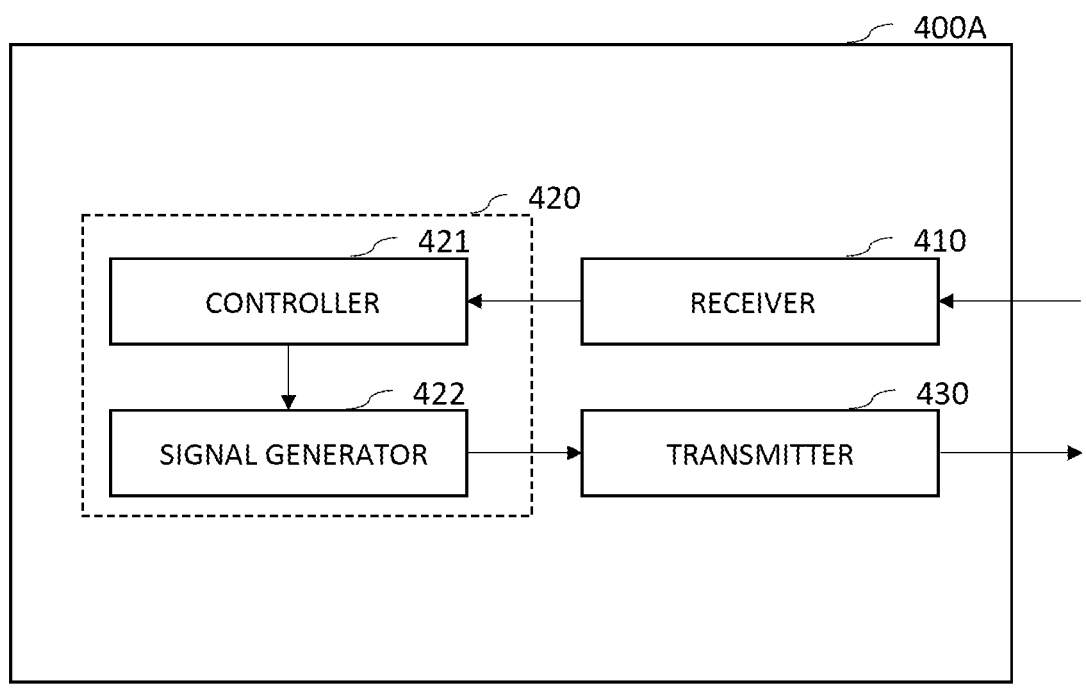
FIG. 5 is a configuration diagram of a communication device 400a according to the first embodiment.

The communication devices 400 (400a to 400g) receive the communication signals transmitted from the communication apparatuses 300a, 300b and transmit communication data. FIG. 5 illustrates a configuration example of the communication device 400a. The communication device 400a includes a receiver 410, a processor 420, and a transmitter 430. The processor 420 includes a controller 421 and a signal generator 422. A configuration example of the communication devices 400b to 400g is the same as that of the communication device 400a, and thus a description thereof will be omitted.

The receiver 410 includes one or more antennas and receives the communication signal transmitted from the communication apparatuses 300a, 300b via the antennas. The communication signal is sent to the controller 421.

The controller 421 receives the communication signal sent from the receiver 410 and instructs the signal generator 422 to generate the communication data. The signal generator 422 generates the communication data based on the instruction sent from the controller 421, and sends the communication data to the transmitter 430. The transmitter 430 includes one or more antennas, and transmits the communication signal sent from the signal generator 422 to the communication apparatuses 300a, 300b via the antennas.

The configuration of the communication device 400a has been described above. At least some of the components of the communication device 400a may be implemented by integrated circuits such as ICs and LSIs. In FIG. 5, the controller 421 and the signal generator 422 are included in the processor 420. The electronic circuit described for the processor 110 can be applied to the processor 420. The receiver 410 and the transmitter 430 include antennas, these antennas may be independent of each other or may be shared by at least some components.

The control apparatus 100 according to the present embodiment acquires the information related to the wireless power supply between the wireless power supply apparatus 200 and the communication apparatuses 300a, 300b, and the communication data acquired by the communication apparatuses 300a, 300b through communication with the communication devices 400. The control apparatus 100 determines and controls the instruction for at least one of the wireless power supply or the wireless communication based on the information related to the wireless power supply and the communication data.

Figure 6:
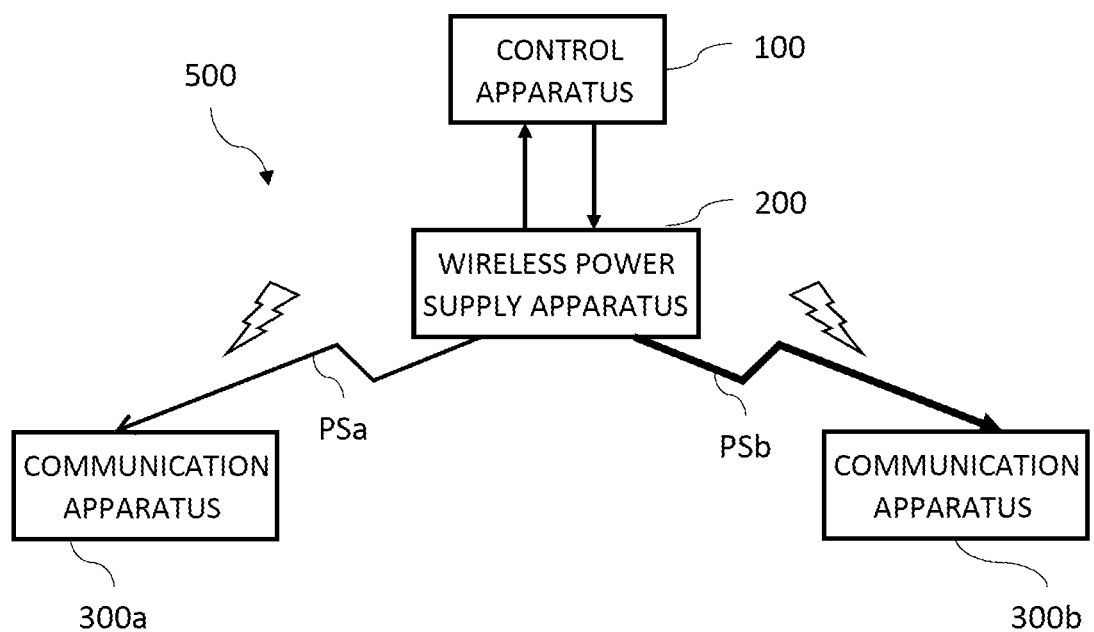
FIG. 6 is a diagram for explaining determination of an instruction of wireless power supply.
Figure 7:
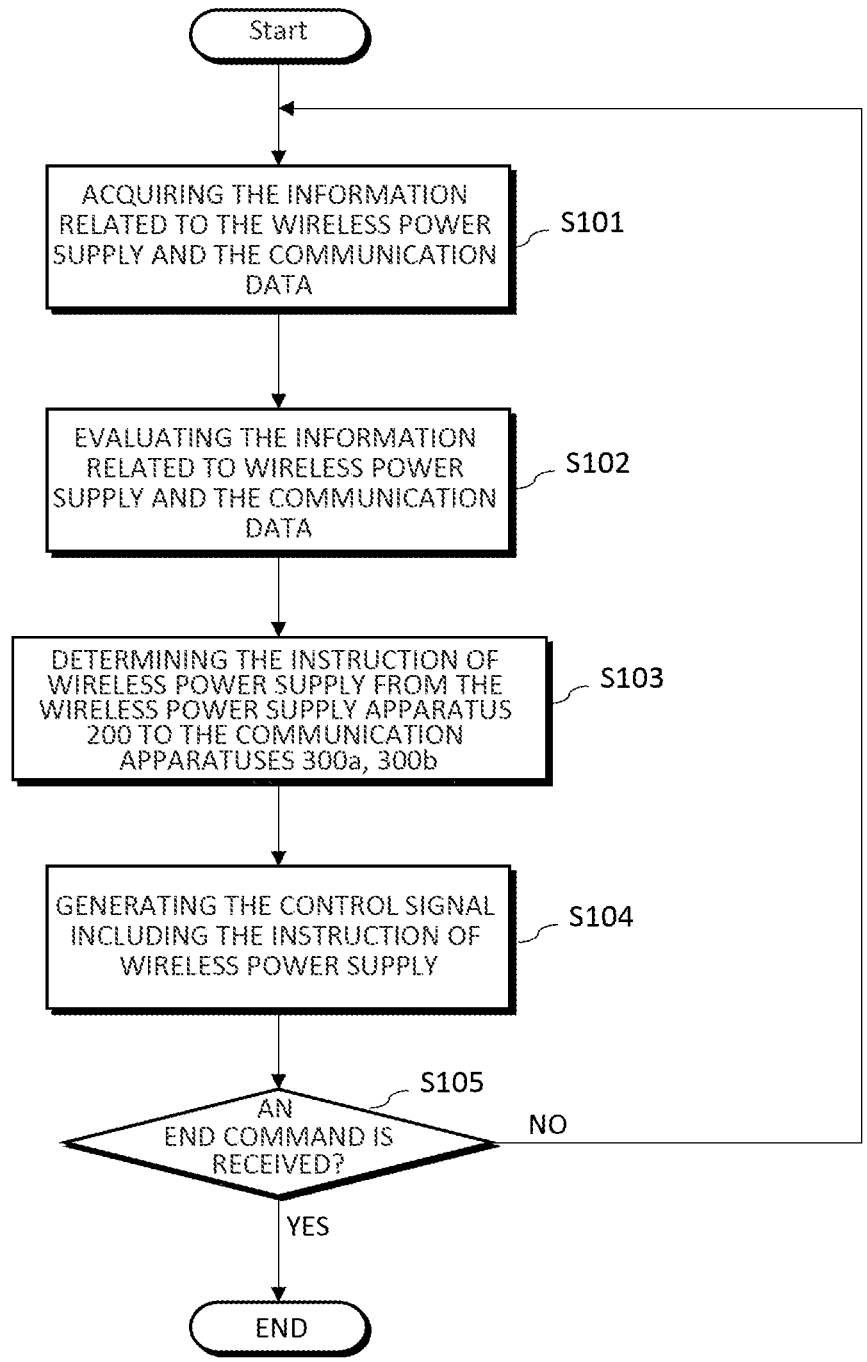
FIG. 7 is a flowchart of an operation of the control apparatus 100 in determining the instruction of wireless power supply.

FIG. 6 is a diagram illustrating an instruction of wireless power supply between the wireless power supply apparatus 200 and the communication apparatuses 300a, 300b as an example of the present embodiment. In FIG. 6, the wireless power supply apparatus 200 performs wireless power supply PSa to the communication apparatus 300a and performs wireless power supply PSb to the communication apparatus 300b. FIG. 7 is a flowchart of an operation of the control apparatus 100 that issues an instruction of wireless power supply. Hereinafter, the operation of the control apparatus 100 will be described in detail. In the present embodiment, it is assumed that the wireless power supply apparatus 200 supplies power to the communication apparatuses 300a, 300b at least once, and the communication apparatuses 300a, 300b acquire the communication data at least once.

The acquisition device 111 acquires the information related to the wireless power supply and the communication data (step S101). The acquisition device 111 causes the storage 120 to hold the acquired information related to the wireless power supply and communication data.

The calculator 112 evaluates the information related to wireless power supply and the communication data held in the storage 120 (step S102). These evaluations are described below.

The calculator 112 evaluates streamlining of wireless power supply in the wireless power supply apparatus 200 and the communication apparatuses 300a, 300b based on the information related to the wireless power supply. For example, one of the communication apparatuses 300a, 300b that is closer to the wireless power supply apparatus 200 can improve the streamlining of wireless power supply. Here, the streamlining refers to the ratio of power received to power used of power supply. Here, the streamlining of the wireless power supply varies depending on the presence or absence of an object or a space interferes with wireless signals between the communication apparatuses 300a, 300b and the wireless power supply apparatus 200. In addition, if there is a difference in suppliable power between the communication apparatuses 300a, 300b, it is possible to improve the streamlining of wireless power supply by the control apparatus 100 determining the instruction of wireless power supply according to the suppliable power to each of the communication apparatuses 300a, 300b. Accordingly, the calculator 112 can evaluate the communication apparatuses 300a, 300b having high streamlining of wireless power supply.

In addition, the calculator 112 can evaluate required power amount for communication with the communication devices 400 performed by the communication apparatus 300a, 300b. The communication apparatuses 300a, 300b communicate with the communication devices 400 within a range in which the communication signal can reach, and acquire the communication data. In this case, the communication data varies depending on the data handled by the communication devices 400 and position of the communication devices 400. Specifically, amount of the communication data acquired by the communication devices 400 may increase depending on the type of various data format of the data, the acquisition time of the data, and the like. Alternatively, as the number of communication devices 400 with which the communication apparatuses 300a, 300b communicate (should communicate) increases, the amount of the communication data increases.

For example, in a case where the communication data is identification information of the communication devices 400, the identification information increases as the number of communication devices 400 to be communicated increases. It is assumed that the communication apparatus 300a communicates with the communication devices 400a to 400c, and the communication apparatus 300b communicates with the communication devices 400c to 400g. In this case, the communication apparatus 300a acquires the communication data of three communication devices 400, and the communication apparatus 300b acquires the communication data of five communication devices 400.

Since the communication data is transmitted to the wireless power supply apparatus 200, as the amount of communication data increases, more power is required. In addition, as the number of communication devices 400 to be communicated, the more power is required. As a result, the calculator 112 can evaluate the power requirements of the communication apparatuses 300a, 300b based on the communication data.

In addition, the calculator 112 can evaluate communication data acquisition performed by the communication apparatuses 300a, 300b based on the communication data. For example, when the communication data is the identification information of the communication devices 400 that has received the communication signal, the communication data may include information on success or failure of acquisition of the identification information of the communication devices 400 and information on acquisition time. The information on success or failure of acquisition of the identification information includes information indicating the identification information or an error in acquisition of the identification information, an acquisition rate (acquisition success rate) of the identification information, information indicating a packet error, or the like. The information related to the acquisition time includes the time required to acquire the identification information of the communication devices 400, the acquisition start time and the acquisition end time, or the like.

For example, since success or failure of acquisition of identification information is affected by power of a communication signal, it is necessary to supply more power in order to improve the acquisition rate of identification information or reduce the packet error rate of the communication apparatuses 300. Further, since the length of the acquisition time of the identification information is affected by the power supplied to the communication apparatuses 300, it is necessary to supply more power in order to shorten the acquisition time of the identification information of the communication apparatuses 300. In this way, the calculator 112 can evaluate on the success or failure of the acquisition of the identification information of the communication devices 400 and the information related to the acquisition time.

These evaluations may be performed by The calculator 112 calculating evaluation values for each of the communication apparatuses 300a, 300b and comparing the evaluation values. In addition, these evaluations may be combined or weighted so as to be comprehensively evaluated. The calculator 112 sends the evaluation result to the determiner 113.

The determiner 113 determines the instruction of wireless power supply from the wireless power supply apparatus 200 to the communication apparatuses 300a, 300b based on the information related to the wireless power supply and the result of evaluation of the communication data (step S103). For example, the determiner 113 determines at least one of a power supply time, a power supply intensity, a power supply frequency, and a power supply amount for each of the communication apparatuses 300a, 300b as the instruction of wireless power supply. For example, the determiner 113 may determine an instruction to perform wireless power supply PSa for the communication apparatus 300a and wireless power supply PSb for the communication apparatus 300b, or may determine to change the instruction to perform wireless power supply PSa' and PSb'. The determiner 113 sends the determined instruction of wireless power supply to the signal generator 114.

The signal generator 114 generates the control signal (power supply control signal) including the instruction of wireless power supply sent from the determiner 113, and the output device 130 outputs (transmits) the control signal to the wireless power supply apparatus 200 (step S104).

The determiner 113 checks whether or not an end instruction to end the operation of the control apparatus 100 has arrived (step S105). This end instruction is an instruction to end the operation of the control apparatus 100 in this flow. The end instruction is sent to the determiner 113 by an input to the control apparatus 100 by the user or by the control apparatus 100 acquiring a signal including the end instruction. The end instruction may be an instruction to immediately end the operation of the control apparatus 100.

When the end instruction has not arrived at the determiner 113 (step S105: No), the process returns to step S101. On the other hand, when the end instruction has arrived at the determiner 113 (step S105: Yes), the flow ends, and the control apparatus 100 ends the operation. After returning to step S101, the control apparatus 100 may perform the operation of this flow again under a predetermined condition.

As described above, the control apparatus 100 evaluates streamlining for wireless power supply, the required power amount, and the acquisition of the communication data of the communication apparatuses 300a, 300b based on the information related to wireless power supply and the communication data, and determines the instruction of wireless power supply. As a result, for example, the control apparatus 100 can issue an instruction to distribute more wireless power supply to the communication apparatus 300 having high streamlining for wireless power supply, to distribute power so as to satisfy the required power amount of each of the communication apparatuses 300a, 300b, or to distribute power so as to correspond to the acquisition of the communication data of the communication devices 400 performed by the communication apparatuses 300a, 300b. Thus, the wireless power supply apparatus 200 can efficiently perform wireless power supply.

Figure 8:
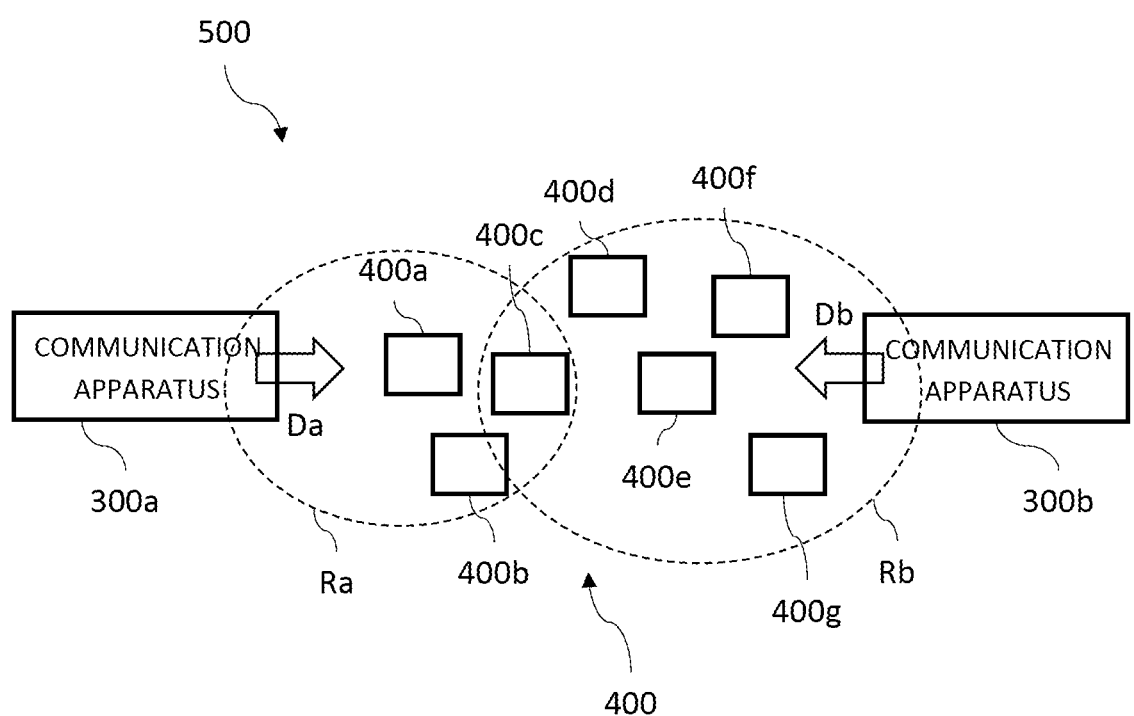
FIG. 8 is a diagram for explaining determination of an instruction of wireless communication.
Figure 9:
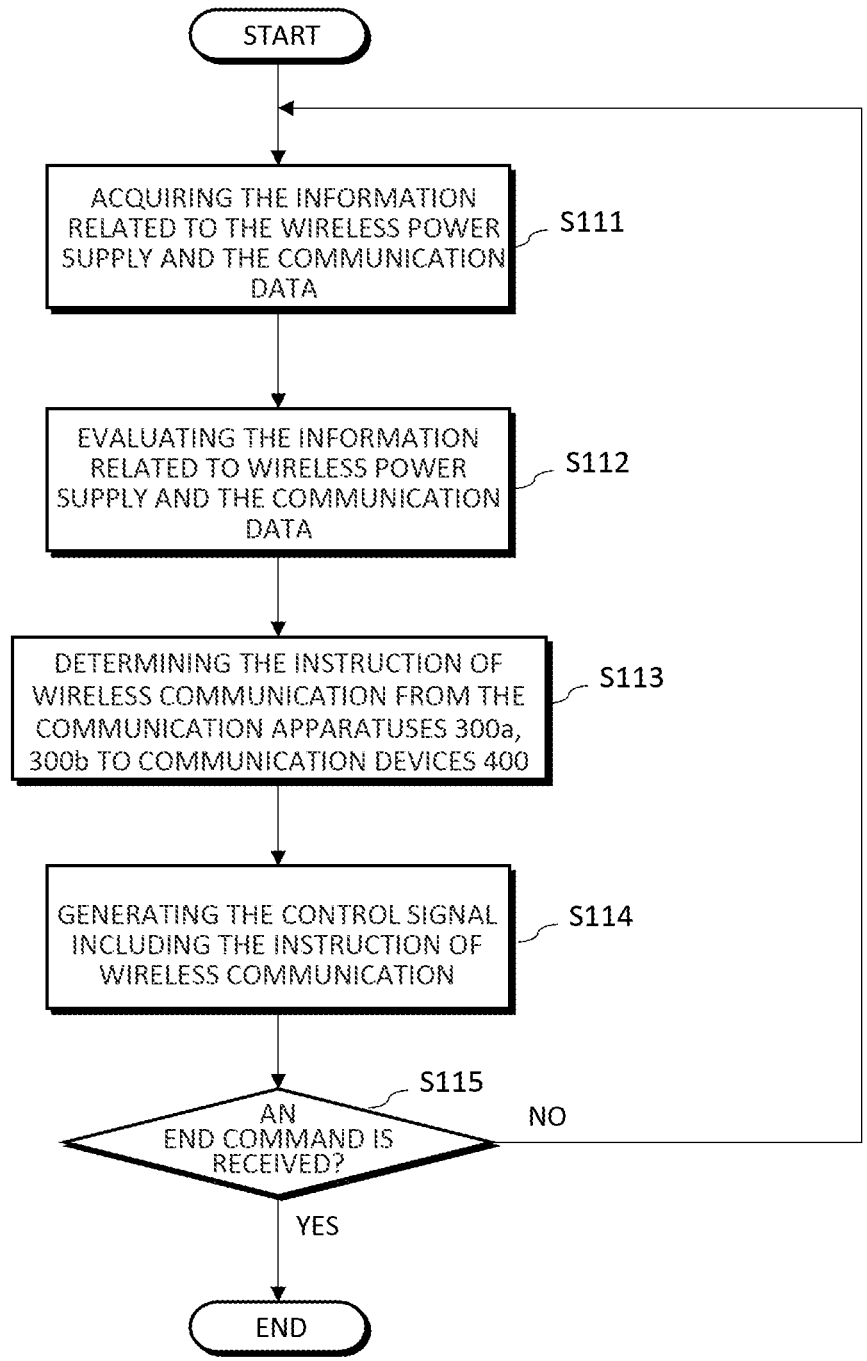
FIG. 9 is a flowchart of the operation of the control apparatus 100 in determining the instruction of wireless communication.

FIG. 8 is a diagram illustrating an instruction of wireless communication between the communication apparatuses 300a, 300b and the communication devices 400 as an example of the present embodiment. In FIG. 8, the communication apparatus 300a transmits the communication signal in a direction Da and a range Ra, and communicates with The communication device 400a to 400c to acquire the communication data. The communication apparatus 300b communicates with the communication devices 400c to 400g in a direction Db and a range Rb to acquire the communication data. FIG. 9 is a flowchart of an operation of the control apparatus 100 that issues the instruction of wireless communication. Hereinafter, the operation of the control apparatus 100 will be described in detail. In the present embodiment, as an example, the communication device 400a to 400g are wireless tags, and the communication apparatuses 300a, 300b have a function of reading the wireless tags. That is, each of the communication device 400a to 400g receives the communication signals from the communication apparatuses 300a, 300b and transmits a response signal including identification information of itself. The communication apparatuses 300a, 300b receive the response signal including the identification information as the communication data. The wireless tag is, for example, an RFID tag.

The acquisition device 111 acquires the information related to wireless power supply and the communication data (step S111). The acquisition device 111 causes the storage 120 to hold the acquired information related to the wireless power supply and communication data.

The calculator 112 evaluates the information related to wireless power supply and the communication data held in the storage 120 (step S112). These evaluations are described below.

The calculator 112 can evaluate the streamlining of wireless power supply from the wireless power supply apparatus 200 to the communication apparatuses 300a, 300b based on the information related to the wireless power supply. Since the details of the evaluation are the same as those in step S102, the description thereof will be omitted. Here, the determiner 113 may cause one of the communication apparatuses 300a, 300b having higher streamlining of wireless power supply to communicate with a larger number of communication devices 400. By doing so, the control apparatus 100 can acquire communication data from a larger number of communication devices 400, in a shorter time, or with a reduced possibility of failure. The determiner 113 may determine the instruction of wireless communication between the communication apparatuses 300a, 300b and the communication devices 400 according to the evaluation of the streamlining of wireless power supply. Here, the instruction of wireless communication is at least one instruction of a direction in which a communication signal is transmitted, a communication frequency, a communication range, power, frequency, transmission timing of the communication signal, or the like. For example, the determiner 113 may cause the communication apparatus 300 having higher streamlining of wireless power supply to transmit the communication signal in a direction in which more communication devices 400 exist. In addition, the determiner 113 may cause the communication apparatus 300 having higher streamlining of wireless power supply to communicate with the communication devices 400 more frequently. In addition, determiner 113 may determine a wider communication range for the communication apparatus 300 having higher streamlining of wireless power supply. In determining the communication range, the power of the communication signal may be determined. This is because by increasing the power of the communication signal, the communication apparatus 300 can also communicate with the communication devices 400 at a farther distance. That is, the communication range can be widened.

In addition, the calculator 112 can evaluate required power amount of the communication apparatus 300a, 300b for wireless communication with the communication devices 400. Since the details of the evaluation are the same as those in step S102, the description thereof will be omitted.

For example, it is assumed that the communication apparatus 300a communicates with The communication device 400a to 400c, and the communication apparatus 300b communicates with the communication devices 400c to 400g. In this case, the communication apparatus 300a acquires the communication data of three communication devices 400, and the communication apparatus 300b acquires the communication data of five communication devices 400. Since the communication data is transmitted to the wireless power supply apparatus 200, as the amount of communication data increases, more power is required. In addition, as the number of communication devices 400 to be communicated, the more power is required. The determiner 113 can determine the instruction of wireless communication between the communication apparatuses 300a, 300b and the communication devices 400 by the calculator 112 evaluating the required power amount. For example, when the streamlining for wireless power supply to the communication apparatuses 300a, 300b are evaluated to be same level, the determiner 113 may determine the instruction of wireless communication so that the request power amounts of the communication apparatuses 300a, 300b are same level. In addition, in a case where the streamlining for wireless power supply to the communication apparatuses 300a, 300b are evaluated to be different level from each other, the determiner 113 may determine the instruction of wireless communication according to the evaluation of the streamlining for wireless power supply.

In addition, the calculator 112 can evaluate communication data acquisition performed by the communication apparatuses 300a, 300b based on the communication data. Since the details of the evaluation are the same as those in step S102, the description thereof will be omitted.

For example, the success or failure of the acquisition of the identification information and the length of the acquisition time of the identification information are affected by the power supplied to the communication apparatuses 300. When the success or failure of the acquisition or the length of the acquisition time becomes worse than a predetermined level, it is considered that at least one of the direction of transmitting the communication signal, the communication frequency, the communication range, the power, the transmission timing, frequency of the communication signal, or the like set in the communication apparatuses 300 are not appropriate. On the other hand, when the success or failure of the acquisition or the length of the acquisition time is higher than the predetermined level, it is considered that there is still a margin in at least one of the direction of transmitting the communication signal, the communication frequency, the communication range, the power, the transmission timing, frequency of the communication signal, or the like set in the communication apparatuses 300. The determiner 113 may determine the instruction of wireless communication in accordance with at least one of the success or failure of acquisition of identification information or the length of acquisition time of the identification information.

These evaluations may be performed by the calculator 112 calculating evaluation values for each of the communication apparatuses 300a, 300b and comparing the evaluation values. In addition, these evaluations may be combined or weighted so as to be comprehensively evaluated. The calculator 112 sends the evaluation result to the determiner 113.

The determiner 113 determines the instruction of wireless communication from the communication apparatuses 300a, 300b to communication devices 400 based on the result of the evaluation of the wireless power supply information and the communication data (step S113). For example, the determiner 113 may determine an instruction to perform wireless communication such that the direction Da and the range Ra of wireless communication are set for the communication apparatus 300a and the direction Db and the range Rb of wireless communication are set for the communication apparatus 300b. Alternatively, the determiner 113 may determine an instruction to change the direction Da to Da' and the range Ra to Ra' of wireless communication for the communication apparatus 300a, and the direction Db to Db' and the range Rb to Rb' of wireless communication for the communication apparatus 300b. The determiner 113 sends the determined instruction of wireless communication to the signal generator 114.

The signal generator 114 generates the control signal (communication control signal) including the instruction of wireless communication sent from the determiner 113, and outputs (transmits) the control signal from the output device 130 to the wireless power supply apparatus 200 (step S114).

The determiner 113 checks whether or not an end instruction to end the operation of the control apparatus 100 has arrived (step S115). This end instruction is an instruction to end the operation of the control apparatus 100 in this flow. The end instruction is sent to the determiner 113 by an input to the control apparatus 100 by the user or by the control apparatus 100 acquiring a signal including the end instruction. The end instruction may be an instruction to immediately end the operation of the control apparatus 100.

When the end instruction has not arrived at the determiner 113 (step S115: No), the process returns to step S101. On the other hand, when the end instruction has arrived at the determiner 113 (step S115: Yes), the flow ends, and the control apparatus 100 ends the operation. After returning to step S111, the control apparatus 100 may perform the operation of this flow again under a predetermined condition.

As described above, the control apparatus 100 evaluates at least one of the streamlining of the wireless power supply, the required power amounts of the communication apparatuses 300a, 300b, or the acquisition of the communication data based on the information related to wireless power supply and the communication data. The control apparatus determines the instruction of the wireless communication based on the evaluated result. Accordingly, for example, the control apparatus 100 may issue at least one of an instruction to determine that the communication apparatus 300 having higher streamlining of wireless power supply communicates with a large number of communication devices 400, an instruction to control the required power amount for each of the communication apparatuses 300a, 300b, or an instruction to control wireless communication according to the acquisition of the identification information of the communication devices 400 performed by the communication apparatuses 300a, 300b. Accordingly, the communication apparatuses 300a, 300b can more efficiently perform communication with the communication devices 400.

Here, depending on conditions, relationship between the streamlining of wireless power supply to the communication apparatuses 300a, 300b and the required power amount of the communication apparatuses 300a, 300b may be the same level or opposite. For example, there is a bias in the positional relationship between the communication apparatuses 300 and the communication devices 400. If the communication apparatus 300a has a higher streamlining of wireless power supply than the communication apparatus 300b, and has a smaller number of communication devices 400 capable of communicating than the communication apparatus 300b, the control apparatus 100 may evaluate the required power amount of the communication apparatus 300b to be equal to or higher than that of the communication apparatus 300a. In this way, the control apparatus 100 may consider the streamlining of wireless power supply to the communication devices 300a and 300b, and determine the required power amount of the communication devices 300a and 300b respectively so that an evaluation result of the communication data acquired by the communication devices 300a and 300b is improved. The control apparatus 100 may determine time allocation, transmission direction of wireless power supply, or the like that can satisfy the required power amount of the communication devices 300a and 300b respectively.

The operation of the control apparatus 100 according to the present embodiment has been described above, various modifications can be implemented and executed. Modifications applicable to the present embodiment will be described below.

(Modification 1)

In the present embodiment, as an example, the communication data has been described as identification information of the communication devices 400. However, the communication data may be various types of data acquired by the communication devices 400 through measurement and imaging. The various data is at least one of measurement data of a physical quantity, audio data, image data, video data, or the like acquired by each of the communication devices 400. Examples of the physical quantity include at least one of a position, an angle, a rotation angle, a speed, an angular velocity, a rotation speed, a rotation number, a current, a voltage, power, a temperature, a light amount, or a frequency.

(Modification 2)

For example, as in the first modification, when the communication devices 400 acquires various data by performing measurement, imaging, or the like, the communication devices 400 needs to include a measurement instrument. In addition, in a case where power supply to the measurement instrument is performed by wireless power supply, it is necessary to provide a power receiver. In this case, since the communication apparatuses 300 supplies power to the communication devices 400, it is necessary to provide a power supplier.

Figure 10:
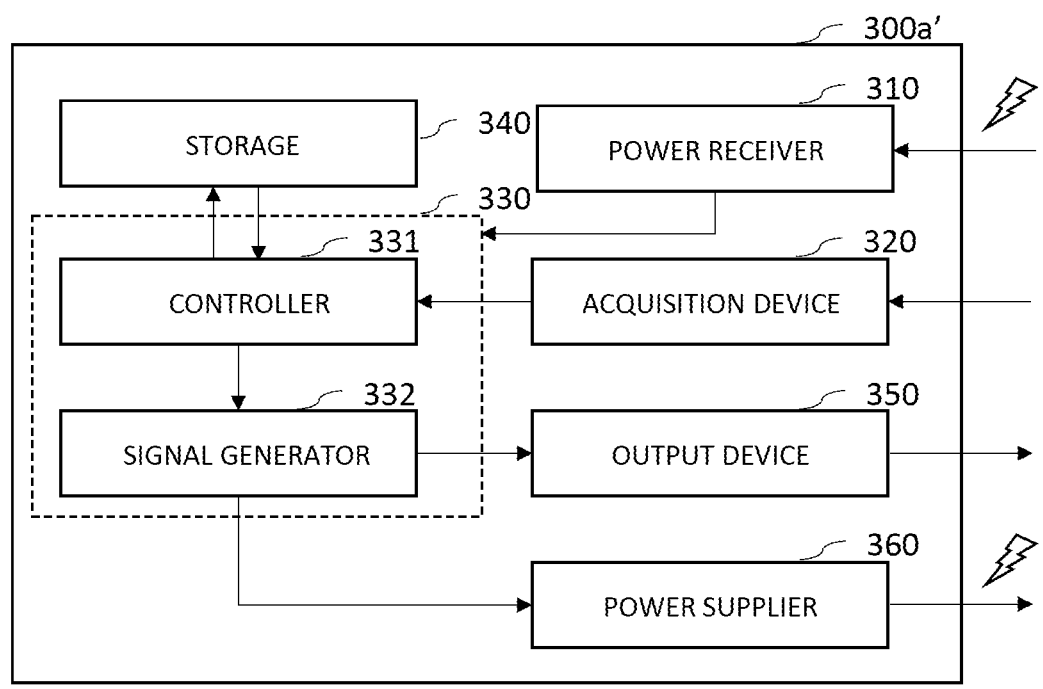
FIG. 10 is a configuration diagram of a communication apparatus 300a' that can be applied to the first embodiment.
Figure 11:
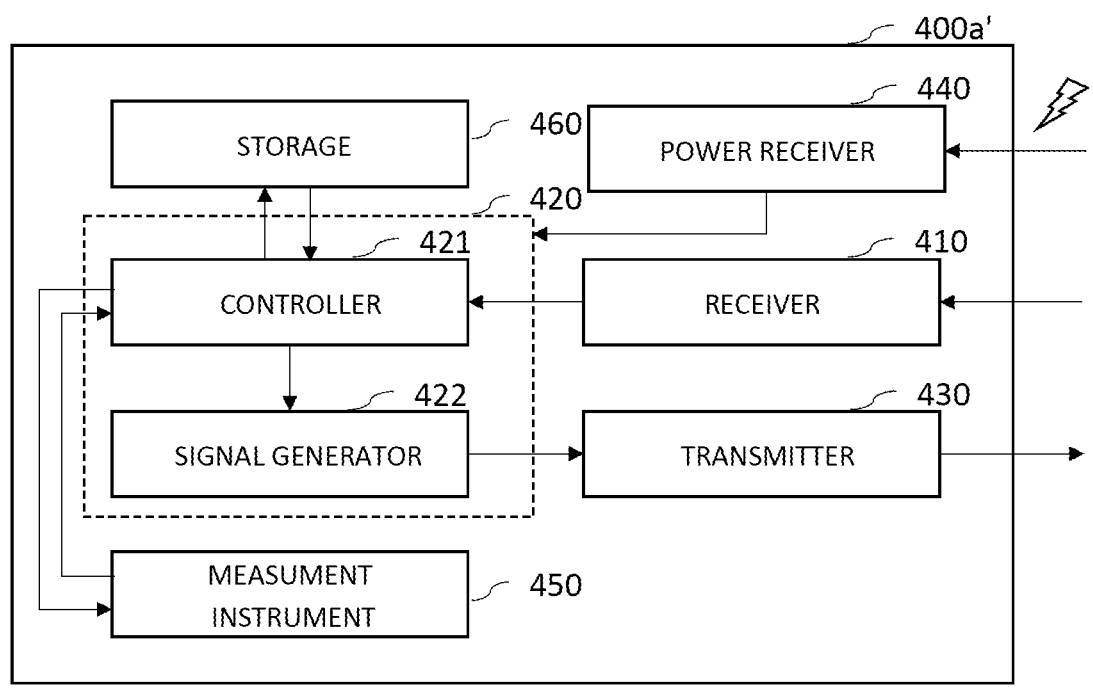
FIG. 11 is a configuration diagram of a communication device 400a' that can be applied to the first embodiment.

FIG. 10 illustrates a configuration example of a communication apparatus 300a' in the present modification, and FIG. 11 illustrates a configuration example of a communication devices 400a'. The communication apparatus 300a' further includes a power supplier 360 in the communication apparatus 300a. Since the communication apparatus 300b' is similar to the communication apparatus 300a', the description thereof will be omitted.

The wireless power supply to the communication devices 400 by the power supplier 360 may be determined by the control apparatus 100. The determination of the wireless power supply can be performed in the same manner as the determination of the wireless power supply from the wireless power supply apparatus 200 to the communication apparatuses 300a, 300b. That is, the control signal (power supply control signal) is transmitted from the control apparatus 100 to the communication apparatuses 300a, 300b directly or via the wireless power supply apparatus 200. The control signal (power supply control signal) is acquired by the receiver 320 and sent to the controller 331. The controller 331 instructs the signal generator 332 to generate a signal for wireless power supply (hereinafter also referred to as a power supply signal) based on the instruction of wireless power supply included in the control signal (power supply control signal) sent from the receiver 320.

The signal generator 332 generates the power supply signal based on the instruction sent from the controller 331, and sends the power supply signal to the power supplier 360. The power supplier 360 includes one or more antennas, transmits the power supply signal to the communication devices 400 via the antennas, and performs wireless power supply. In FIG. 10, a lightning mark is added to indicate that power is supplied.

The communication apparatus 300a' has been described above. The communication apparatuses 300a' and 300b' can perform not only wireless communication but also wireless power supply to the communication devices 400. Note that the antenna of the power supplier 360 may be independent of the antennas of the power receiver 310, the receiver 320, and the transmitter 350, or may be shared by at least some of the antennas.

FIG. 11 illustrates a configuration example of The communication device 400a' in the present modification. The communication device 400a' further includes a power receiver 440, a measurement instrument 450, and a storage 460 in the communication device 400a. Since the communication devices 400b' to 400g' are the same as 400a', the description thereof will be omitted.

The power receiver 440 includes one or more antennas and receives the power supply signal transmitted from the communication apparatuses 300a' and 300b'. The received power is supplied to the processor 420, the receiver 410, the transmitter 430, and the measurement instrument 450. The power receiver 440 may include a power storage device, and the received power may be stored in the power storage device. The processor 420, the receiver 410, the transmitter 430, and the measurement instrument 450 may be supplied with power necessary for driving from the power storage device. In FIG. 11, power is supplied with a lightning mark.

The measurement instrument 450 measures various data representing at least one of measurement data of a physical quantity, audio data, image data, video data, or the like. The measurement instrument 450 is, for example, a sensor that measures a physical quantity or sound, or a sensor that acquires an image or video. The measurement instrument 450 sends various kinds of measured and imaged data to the controller 421.

The controller 421 associates identification information of its own communication devices 400a with the various types of information sent from the measurement instrument 450 to generate the communication data, and stores the communication data in the storage 460. The controller 421 extracts the communication signal stored in the storage 460 and sends the communication signal to the signal generator 422 in response to a predetermined time or time interval, an instruction (communication signal) from the communication apparatus 300a' or 300b', or the like. This communication data is transmitted to the communication apparatuses 300a' and 300b' in the same manner as in the present embodiment.

The storage 460 holds the communication data sent from the controller 421. For the storage 460, the device and method described for the storage 120 can be applied.

Note that the antenna of the power receiver 440 may be independent of the antennas of the receiver 410, and the transmitter 430, or may be shared by at least some of the antennas.

The communication device 400a' has been described above. The communication device 400a' to 400g' can measure and image various kinds of data and transmit them as communication data to the communication apparatuses 300a' and 300b'.

(Modification 3)

In the present embodiment, the control apparatus 100 acquires at least one of the propagation path information between the wireless power supply apparatus 200 and each of the communication apparatuses 300a, 300b, the propagation condition of the wireless power supply, the suppliable power to the communication apparatuses 300a, 300b, information indicating the positions of the wireless power supply apparatus 200 and the communication apparatuses 300a, 300b (including estimated information), or the required power amount of the communication apparatuses 300a, 300b. The control apparatus 100 may acquire propagation path information between the wireless power supply apparatus 200 and the communication apparatuses 300a, 300b, and calculate matters related to wireless power supply based on the propagation path information. The matters related to the wireless power supply are matters included in the information related to the wireless power supply excluding the propagation path information, for example, propagation conditions of the wireless power supply, suppliable power to the communication apparatuses 300a, 300b, positions of the wireless power supply apparatus 200 and the communication apparatuses 300a, 300b, and required power amounts of the communication apparatuses 300a, 300b in acquiring the communication data.

Figure 12:
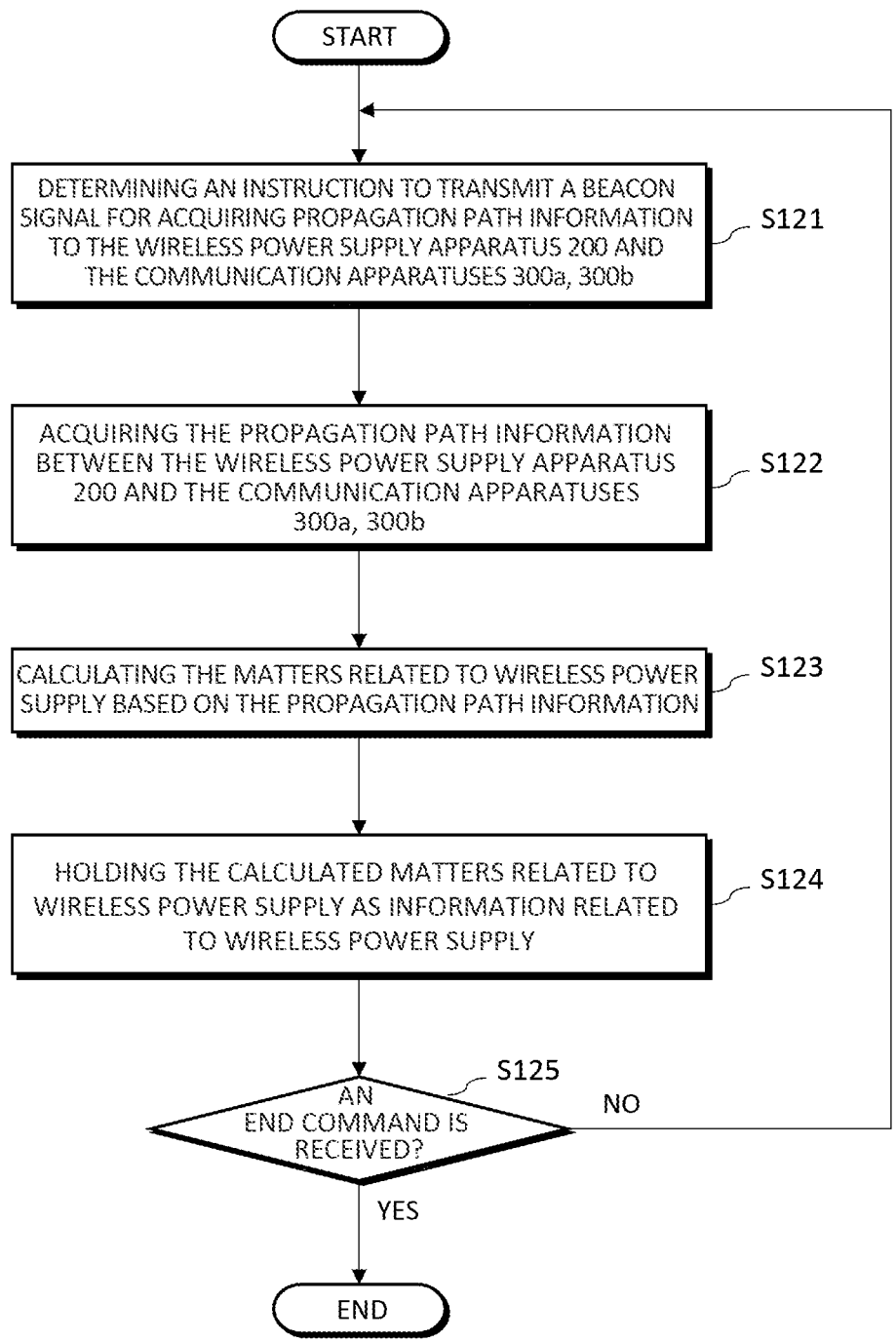
FIG. 12 is a flowchart of an operation of the control apparatus 100 in calculation of matters related to wireless power supply.

FIG. 12 is a flowchart illustrating an operation of the control apparatus 100 associated with calculation of the matters related to wireless power supply. This will be described with reference to FIG. 12. The control apparatus 100 of the present modification acquires propagation path information between the wireless power supply apparatus 200 and the communication apparatuses 300a, 300b, and calculates the matters related to wireless power supply.

The determiner 113 determines an instruction to transmit a beacon signal for acquiring propagation path information to the wireless power supply apparatus 200 and the communication apparatuses 300a, 300b. The signal generator 114 generates a signal including the instruction (hereinafter also referred to as an instruction signal), and outputs (transmits) the instruction signal from the output device 130 to the wireless power supply apparatus 200 and the communication apparatuses 300a, 300b (step S121). The wireless power supply apparatus 200 and the communication apparatuses 300a, 300b receive the instruction signal and broadcast a beacon signal. Rach of the wireless power supply apparatus 200 and the communication apparatuses 300a, 300b receives the beacon signal and measures propagation path with the transmission source. The wireless power supply apparatus 200 and the communication apparatuses 300a, 300b send the measured propagation path information to the control apparatus 100 directly or via the wireless power supply apparatus 200.

The acquisition device 111 acquires the propagation path information between the wireless power supply apparatus 200 and the communication apparatuses 300a, 300b (step S122). The propagation path information is sent to the calculator 112.

The calculator 112 calculates the matters related to wireless power supply based on the propagation path information (step S123). The calculator 112 causes the storage 120 to hold the calculated matters related to wireless power supply as information related to wireless power supply (step S124).

The determiner 113 checks whether or not an end instruction to end the operation of the control apparatus 100 has arrived (step S125). This end instruction is an instruction to end the operation of the control apparatus 100 in this flow. The end instruction is sent to the determiner 113 by an input to the control apparatus 100 by the user or by the control apparatus 100 acquiring a signal including the end instruction. The end instruction may be an instruction to immediately end the operation of the control apparatus 100.

When the end instruction has not arrived at the determiner 113 (step S125: No), the process returns to step S101. On the other hand, when the end instruction has arrived at the determiner 113 (step S125: Yes), the flow ends, and the control apparatus 100 ends the operation. After returning to step S121, the control apparatus 100 may perform the operation of this flow again under an arbitrary condition. For example, it may be performed at a predetermined time interval or at a predetermined time. This may be performed by an input to the control apparatus 100 by the user.

The operation by the control apparatus 100 associated with the calculation of the matters related to the wireless power supply has been described above. The control apparatus 100 acquires the propagation path information between the wireless power supply apparatus 200 and the communication apparatuses 300a, 300b, and calculates the matters related to wireless power supply based on the propagation path information. Accordingly, for example, even when the positions of the wireless power supply apparatus 200 and the communication apparatuses 300a, 300b are changed or the propagation path is fluctuated, it is possible to acquire the information related to wireless power supply.

When wireless power supply is also performed on the communication devices 400 as in Modification 2, the control apparatus 100 may acquire propagation path information between the communication apparatuses 300a, 300b and the communication devices 400 respectively, and calculate matters related to wireless power supply between the communication apparatuses 300a, 300b and the communication devices 400 respectively based on the propagation path information.

The difference from the step S121 in this case will be described below. The determiner 113 determines an instruction to transmit a beacon signal for acquiring propagation path information to the communication apparatuses 300a, 300b and the communication devices 400. The signal generator 114 generates an instruction signal including the instruction and outputs (transmits) the instruction signal from the output device 130 to the direct or indirect communication apparatuses 300a, 300b and the communication devices 400 (step S121'). The communication apparatuses 300a, 300b and the communication devices 400 receive the instruction signal and broadcast a beacon signal. The communication apparatuses 300a, 300b and the communication devices 400 receive the beacon signal and measure propagation path with the transmission source. The communication apparatuses 300a, 300b and the communication devices 400 transmit the propagation path information to the control apparatus 100 directly or via the communication apparatuses 300a, 300b and the wireless power supply apparatus 200.

The acquisition of the propagation path information and the calculation and holding of the matters related to the wireless power supply are the same as those in steps S122 to S124. In this case, the calculator 122 calculates matters related to wireless power supply between the communication apparatuses 300a, 300b and the communication devices 400. Accordingly, for example, even when the positions of at least one of the communication apparatuses 300a, 300b, or the communication devices 400 are changed or the propagation path is changed, it is possible to acquire information related to wireless power supply corresponding to the change.

(Modification 4)

Functions performed by the components of the control apparatus 100 may be realized by a processing device similar to the processor 110 processing a program. The processing device processes the program to implement each component included in the processor 110 illustrated in FIG. 2. The program may be provided by being stored in a computer-readable storage medium such as a CD-ROM, a memory card, a CD-R, or a digital versatile disk (DVD) as a file in an installable format or an executable format. The program may be stored in a computer connected to a network such as the Internet and provided via the network, or may be provided by being incorporated in a storage medium such as a ROM, an HDD, or an SSD.

An example of the program is as follows. The program is to make a processor to execute a method including: acquiring communication data from at least one communication apparatus that perform wireless communication with a plurality of the communication devices; acquiring information related to a wireless power supply performed by a wireless power supply apparatus to the at least one communication apparatus; and generating a control signal indicating an instruction of at least one of the wireless power supply or the wireless communication based on the communication data and the information related to the wireless power supply.

The modification of the present embodiment has been described above. The control apparatus according to the present embodiment acquires communication data acquired by at least one communication apparatus that wirelessly communicate with a plurality of communication devices and information related to wireless power supply between the at least one communication apparatus and a wireless power supply apparatus that wirelessly supplies power to the at least one communication apparatus. The control apparatus controls at least one of the wireless power supply and the wireless communication based on the communication data and the information related to wireless power supply. In this way, the control apparatus can make at least one of the wireless power supply and the wireless communication more efficient and streamlining.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising a processor configured to:
acquire communication data from at least one communication apparatus that perform wireless communication with a plurality of communication devices;

acquire information related to a wireless power supply performed by a wireless power supply apparatus to the at least one communication apparatus; and generate a control signal indicating an instruction of at least one of the wireless power supply or the wireless communication based on the communication data and the information related to the wireless power supply.

2. The electronic apparatus according to claim 1, wherein the at least one communication apparatus include a first communication apparatus and a second communication apparatus, and the processor is configured to determine the instruction for wireless power supply to at least one of the first communication apparatus and the second communication apparatus in accordance with:

a data amount of first communication data acquired by the first communication apparatus through the wireless communication or number of communication devices that communicate with the first communication apparatus; and a data amount of second communication data acquired by the second communication apparatus through the wireless communication or number of communication devices that communicate with the second communication apparatus.

3. The electronic apparatus according to claim 1, wherein the at least one communication apparatus include a first communication apparatus and a second communication apparatus, first communication data acquired by the first communication apparatus includes first identification information of at least one communication device that communicates with the first communication apparatus, and second communication data acquired by the second communication apparatus includes second identification information of at least one communication device that communicates with the second communication apparatus, and the processor is configured to determine the instruction for wireless power supply to at least one of the first communication apparatus and the second communication apparatus based on the first identification information, the second identification information, and the information related to wireless power supply.

4. The electronic apparatus according to claim 3, wherein the processor is configured to:

calculate a first evaluation value related to acquisition of the first identification information based on the first identification information;

calculate a second evaluation value related to acquisition of the second identification information based on the second identification information; and determine the instruction for wireless power supply to at least one of the first communication apparatus and the second communication apparatus based on the first evaluation value, the second evaluation value, and the information related to wireless power supply.

5. The electronic apparatus according to claim 3, wherein the processor is configured to:

acquire a first evaluation value related to acquisition of the first identification information and a second evaluation value related to acquisition of the second identification information; and determines the instruction for wireless power supply to at least one of the first communication apparatus and the second communication apparatus based on the first evaluation value, the second evaluation value, and the information related to wireless power supply.

6. The electronic apparatus according to claim 4, wherein the first evaluation value is an evaluation value based on at least one of, success or failure of acquisition of the first identification information, or an acquisition time of the first identification information, and the second evaluation value is an evaluation value based on at least one of, success or failure of acquisition of the second identification information, or an acquisition time of the second identification information.

7. The electronic apparatus according to claim 5, wherein the first evaluation value is an evaluation value based on at least one of, success or failure of acquisition of the first identification information, or an acquisition time of the first identification information, and the second evaluation value is an evaluation value based on at least one of, success or failure of acquisition of the second identification information, or an acquisition time of the second identification information.

8. The electronic apparatus according to claim 1, wherein the processor is configured to:

acquire propagation path information between the wireless power supply apparatus and the communication apparatus; and calculate, based on the propagation path information, at least one of a propagation condition of the wireless power supply, suppliable power to the at least one communication apparatus, a position of the wireless power supply apparatus and the at least one communication apparatus, or a required power amount of the at least one communication apparatus in acquiring the communication data as the information related to the wireless power supply.

9. The electronic apparatus according to claim 1, wherein the processor is configured to acquire at least one of a propagation condition of the wireless power supply, suppliable power to the at least one communication apparatus, a position of the wireless power supply apparatus and the at least one communication apparatus, or a required power amount of the at least one communication apparatus in acquiring the communication data as the information related to the wireless power supply.

10. The electronic apparatus according to claim 1, wherein the processor configured to determine at least one of a power supply time, a power supply intensity, a power supply frequency, or a power supply amount to the at least one communication apparatus, and instruct the wireless power supply to the at least one communication apparatus.

11. The electronic apparatus according to claim 1, wherein the processor configured to determine at least one of a direction, a range, a frequency, or power of a communication signal in which the at least one communication apparatus perform wireless communication with the plurality of communication devices as the instruction of the wireless communication.

12. The electronic apparatus according to claim 1, further comprising:

a transmitter to transmit the control signal to the at least one communication apparatus or the wireless power supply apparatus.

13. A system comprising:
   at least one communication apparatus;
   a wireless power supply apparatus; and
   the electronic apparatus according to claim 1.

14. A method comprising:
   acquiring communication data from at least one communication apparatus that perform wireless communication with a plurality of the communication devices;
   acquiring information related to a wireless power supply performed by a wireless power supply apparatus to the at least one communication apparatus; and
   generating a control signal indicating an instruction of at least one of the wireless power supply or the wireless communication based on the communication data and the information related to the wireless power supply.

15. A non-transitory recording medium in which a program is stored to make a processor to execute a method comprising:
   acquiring communication data from at least one communication apparatus that perform wireless communication with a plurality of the communication devices;
   acquiring information related to a wireless power supply performed by a wireless power supply apparatus to the at least one communication apparatus; and
   generating a control signal indicating an instruction of at least one of the wireless power supply or the wireless communication based on the communication data and the information related to the wireless power supply.

* * * * *